(12) United States Patent
Wang et al.

(10) Patent No.: US 9,649,966 B2
(45) Date of Patent: May 16, 2017

(54) TRUCK BODY FOR A MACHINE

(71) Applicant: Caterpillar Inc., Peoria, IL (US)

(72) Inventors: Huijun Wang, Peoria, IL (US); Donald A. Stickel, III, Chillicothe, IL (US); Howard W. Ludewig, Groveland, IL (US); Danny L. McCaherty, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/728,302

(22) Filed: Jun. 2, 2015

(65) Prior Publication Data

US 2016/0355117 A1  Dec. 8, 2016

(51) Int. Cl.
*B60P 1/04* (2006.01)
*B23K 9/00* (2006.01)
*B62D 65/18* (2006.01)

(52) U.S. Cl.
CPC ....... *B60P 1/04* (2013.01); *B23K 9/00* (2013.01); *B62D 65/18* (2013.01)

(58) Field of Classification Search
CPC .............. B60P 1/04; B62D 65/15; B23K 9/00
See application file for complete search history.

(56) References Cited

U.S. PATENT DOCUMENTS

| 3,620,864 | A | 11/1971 | Heffner |
| 4,593,449 | A | 6/1986 | Meray-Hovarth et al. |
| 7,914,069 | B2 * | 3/2011 | Barbe ............... F41H 7/042 296/193.07 |
| 2007/0160793 | A1 | 7/2007 | Cageao et al. |
| 2007/0256379 | A1 | 11/2007 | Edwards |
| 2009/0028658 | A1 * | 1/2009 | Adams ............ B60P 7/0815 410/104 |
| 2014/0054925 | A1 * | 2/2014 | Hyde ................ B60P 1/286 296/183.2 |
| 2015/0089891 | A1 * | 4/2015 | Schiffmann ........ B29C 70/865 52/309.1 |

* cited by examiner

*Primary Examiner* — Glenn Dayoan
*Assistant Examiner* — Melissa A Black
(74) *Attorney, Agent, or Firm* — William R. Tinker

(57) ABSTRACT

A truck body for a machine is disclosed. The truck body has a bottom wall defining a front end and a rear end, a pair of lateral walls extending from the bottom wall, and a front wall extending between the pair of lateral walls at the front end. The truck body includes a pair of bottom beams pivotally coupled to a frame of the machine. The truck body further includes a plurality of tubes disposed on the pair of bottom beams. Each of the plurality of tubes is disposed adjacent to each other to at least define the bottom wall and the pair of lateral walls of the truck body.

14 Claims, 7 Drawing Sheets

TRUCK BODY FOR A MACHINE

TECHNICAL FIELD

The present disclosure relates to a truck body for a machine.

BACKGROUND

Machines, such as trucks, include a truck body disposed behind an operator cab of the machine for loading and unloading material. The truck body is for carrying a payload of the material. The truck body includes a frame formed by multiple beams for defining a bottom side and lateral sides for the truck body. The beams are generally made from steel or cast iron. Further, metal sheets are supported on the multiples beams to define a bottom wall and side walls to contain the payload of the material. Construction of such truck body from multiple beams and metal sheets increase a weight of the machine, thereby reducing efficiency. Such increased weight may increase shipping costs of the truck body.

US Patent Publication Number 2007/0256379 discloses a composite panel consisting of outer skins and an inner core consisting of a foamed polymer. The structure or properties of the inner core are anisotropic. The composite panel is made by applying external heat and pressure to melt a skin of thermoplastic composite and an initial thickness of a thermoplastic core which has anisotropic properties causing the skin and core to fuse together followed by cooling the fused structure. The composite panel is made by applying external heat and pressure to melt layers of a thermoplastic adhesive positioned between the outer skins and an inner core consisting of a foamed polymer so that the skins are bonded to the core by the melted layers of the thermoplastic adhesive followed by cooling the bonded structure.

SUMMARY OF THE DISCLOSURE

In one aspect of the present disclosure, a truck body for a machine is provided. The truck body has a bottom wall defining a front end and a rear end, a pair of lateral walls extending from the bottom wall, and a front wall extending between the pair of lateral walls at the front end. The truck body includes a pair of bottom beams configured to be pivotally coupled to a frame of the machine. The truck body further includes a plurality of tubes disposed on the pair of bottom beams. Each of the plurality of tubes is disposed adjacent to each other to at least define the bottom wall and the pair of lateral walls of the truck body.

In another aspect of the present disclosure, a transport container for shipping a truck body is provided. The truck body includes a plurality of first tubes configured to define a bottom wall and a pair of lateral walls for the truck body. The transport container includes a base and a plurality of side walls extending from the base. The base and the plurality of side walls define a space therebetween. The space is configured to receive the plurality of first tubes such that at least a portion of each of the plurality of first tubes is disposed adjacent to one of the plurality of side walls of the transport container. The base of the transport container has a length equal to or greater than a maximum width of the truck body. Further, the base of the transport container has a width equal to or greater than a maximum height of the truck body.

In yet another aspect of the present disclosure, a method of assembling a truck body of a machine is provided. The method includes defining a plurality of notches on a pair of bottom beams. The pair of bottom beams is configured to be pivotally coupled to a frame of the machine. The method further includes disposing a plurality of first tubes adjacent to each other on the pair of bottom beams to at least define a bottom wall and a pair of lateral walls of the truck body. Each of the plurality of first tubes is engaged with each of the plurality of notches. The method further includes welding each of the plurality of first tubes with the pair of bottom beams.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
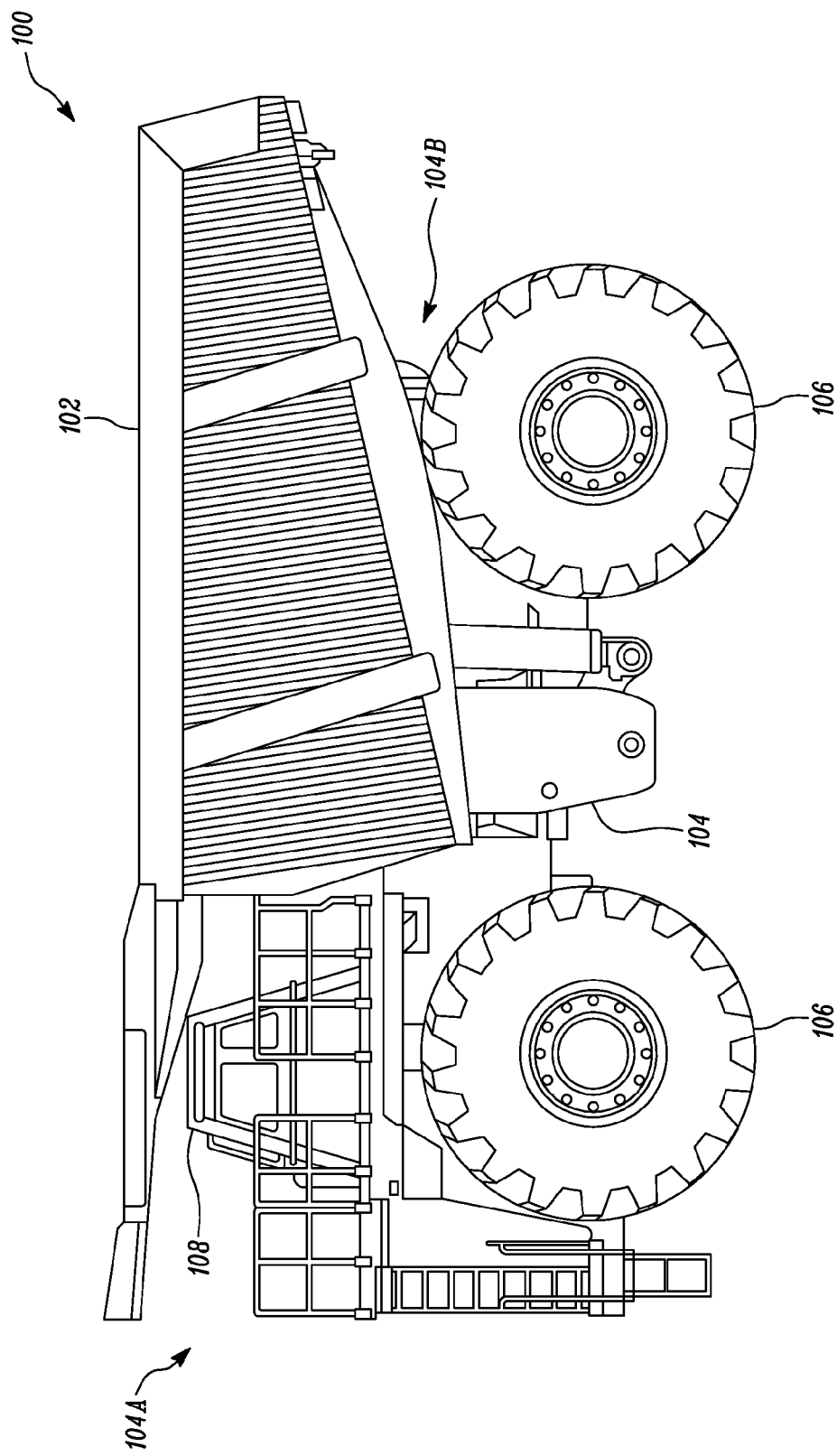
FIG. 1 is a side view of a machine having a truck body, according to an embodiment of the present disclosure.

FIG. 1 illustrates a side view of a machine 100 having a truck body 102, according to an embodiment of the present disclosure. The machine 100 may be used in various industries, such as construction, mining and any other known industries for transporting material from one location to another location. The machine 100 includes a frame 104 for supporting various components of the machine 100 including, but not limited to, the truck body 102. The frame 104 may define a first end 104A and a second end 104B for the machine 100. The machine 100 may further include an engine (not shown) for propelling the machine 100.

The machine 100 further includes a plurality of ground engaging members 106 supported from the frame 104 to drive the machine 100 over a ground surface. In an embodiment, the ground engaging members 106 may be configured to receive power from the engine via a transmission system (not shown). The transmission system may provide various speeds and torques to the ground engaging members 106. In another embodiment, the engine may be coupled to a generator (not shown) to electrically drive the ground engaging members 106 via one or more electric motors. The machine 100 further includes an operator station 108 disposed adjacent to the first end 104A of the machine 100. The operator station 108 may include various control levers and/or switches for controlling various operations of the machine 100.

The truck body 102 is configured to contain a payload of a material. The truck body 102 is pivotally disposed on the frame 104 behind the operator station 108. The truck body 102 is further coupled to the frame 104 via one or more hydraulic cylinders (not shown) to move the truck body 102 relative to the frame 104 to load and unload the material. The hydraulic cylinders may be in communication with a hydraulic system of the machine 100 and actuated by one or more control levers disposed in the operator station 108.

Figure 2:
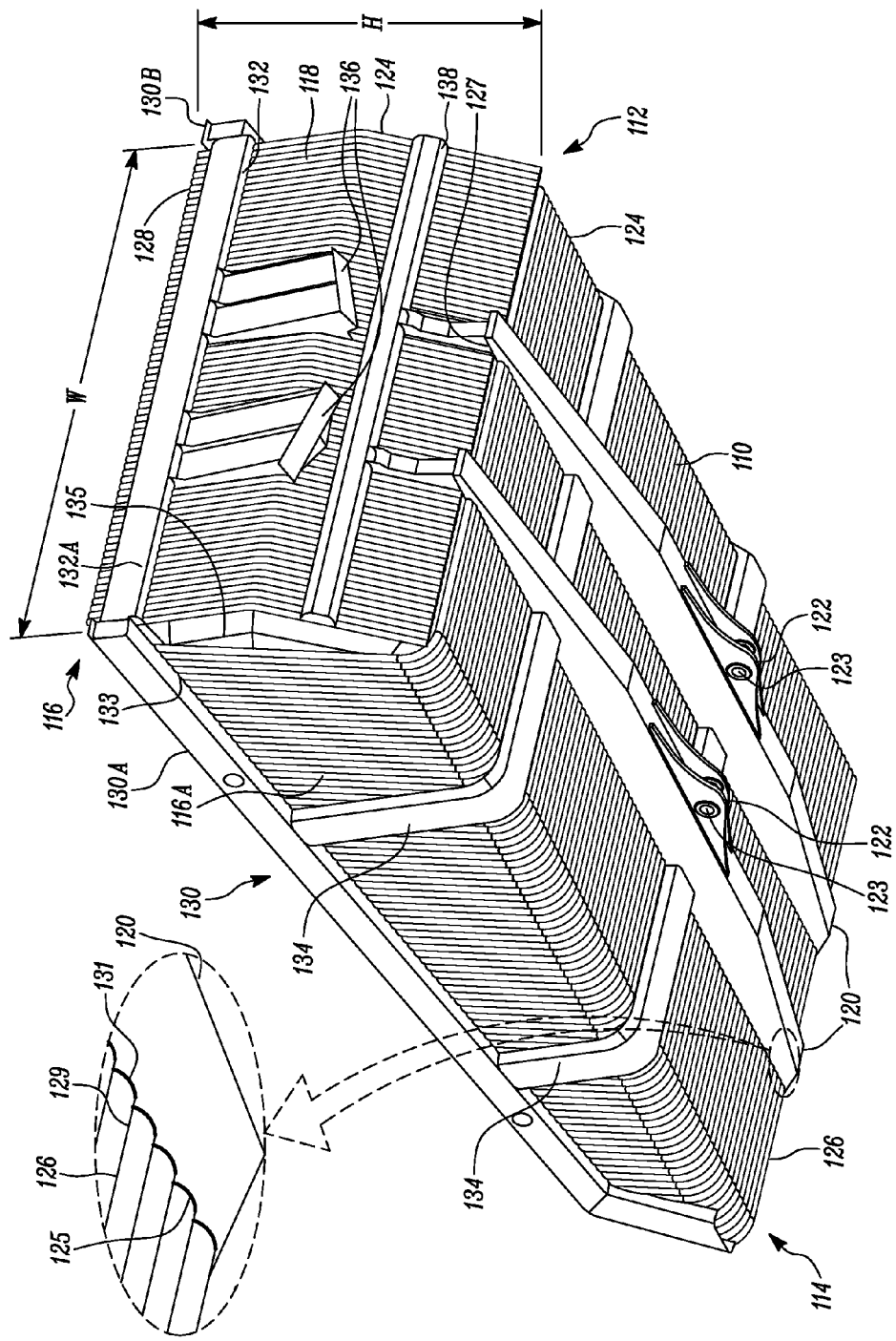
FIG. 2 is a bottom perspective view of the truck body formed by a plurality of first and second tubes, according to an embodiment of the present disclosure.

FIG. 2 illustrates a bottom perspective view of the truck body 102, according to an embodiment of the present disclosure. The truck body 102 includes a bottom wall 110 defining a front end 112 and a rear end 114 for the truck body 102. The bottom wall 110 further defines a maximum width 'W' of the truck body 102. The truck body 102 further includes a pair of lateral walls 116 extending from the bottom wall 110. The pair of lateral walls 116 includes a first side wall 116A and a second side wall 116B (shown in FIG. 2). The truck body 102 further includes a front wall 118 extending from the bottom wall 110 adjacent to the front end 112. The front wall 118 further extends between the first and second side walls 116A, 116B. The front wall 118 and each of the first and second side walls 116A, 116B together define a maximum height 'H' for the truck body 102 with respect to the bottom wall 110.

The truck body 102 further includes a pair of bottom beams 120 disposed adjacent to the bottom wall 110 and extending between the front and rear ends 112, 114 of the truck body 102. Each of the bottom beams 120 is configured to be pivotally supported on the frame 104. Each of the bottom beams 120 further includes a hinge member 122 disposed proximal to the rear end 114 of the truck body 102. The hinge member 122 defines a hole 123 configured to receive a pin member (not shown) therein. The hole 123 in the hinge member 122 is configured to align with a hole defined in the frame 104 of the machine 100. Thus, the hinge members 122 and the pin members enable the truck body 102 to be pivotally disposed on the frame 104 to load and unload the material. In an embodiment, one or more coupling members (not shown) may be mounted on the bottom beams 120 for pivotally coupling with the one or more hydraulic cylinders.

The truck body 102 further includes a plurality of tubes 124 disposed on the bottom beams 120. Each of the plurality of tubes 124 is disposed adjacent to each other to at least define the bottom wall 110 and the pair of lateral walls 116 of the truck body 102. The plurality of tubes 124 further includes a plurality of first tubes 126 and a plurality of second tubes 128. The plurality of first tubes 126 is configured to define the bottom wall 110, and the first and second side walls 116A, 116B. The plurality of second tubes 128 is configured to define the front wall 118. Each of the first and second tubes 126, 128 will be described in detail later with reference to FIG. 4 and FIG. 5, respectively.

Figure 3:
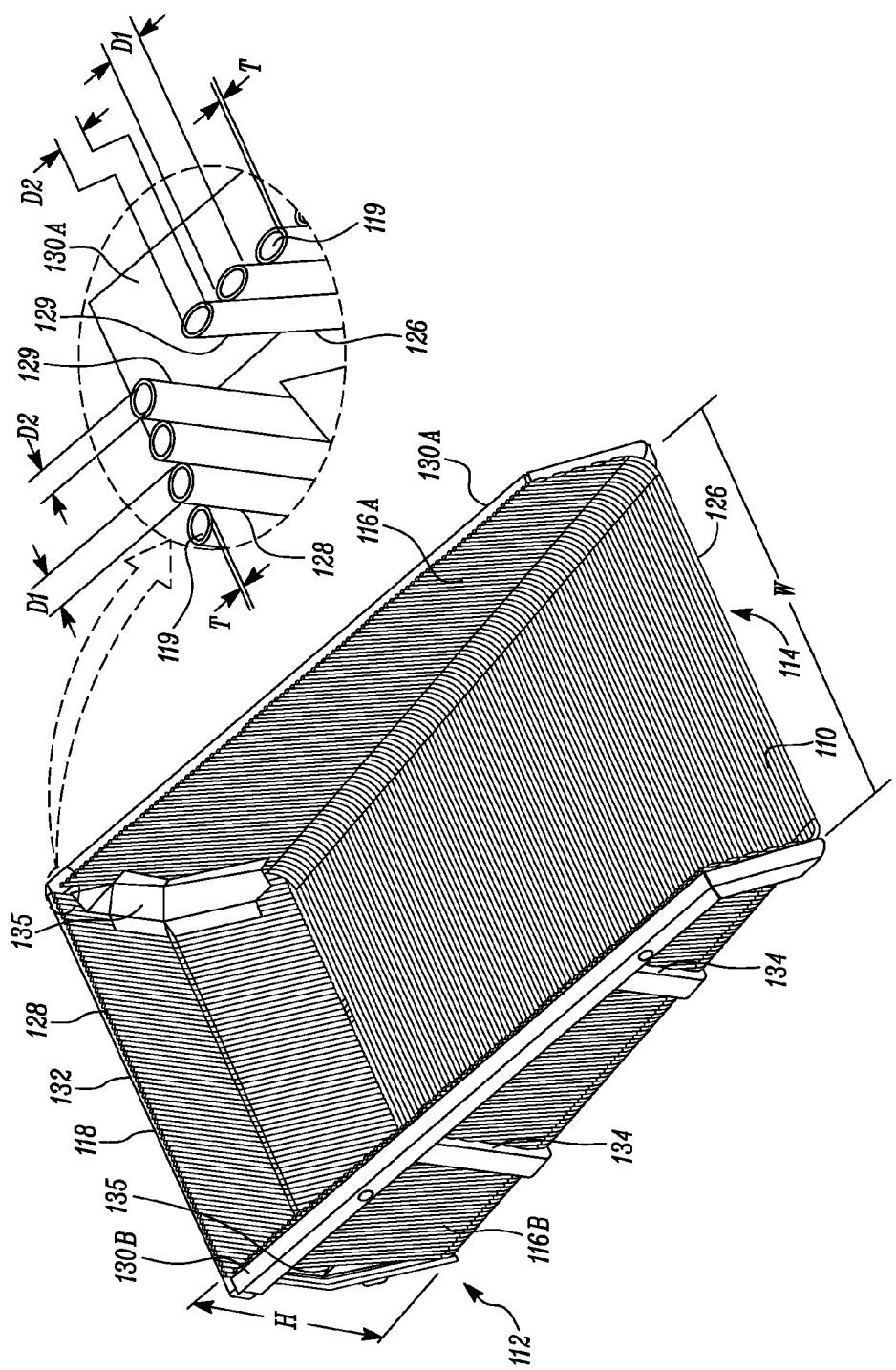
FIG. 3 is a top perspective view of the truck body of FIG. 2, according to an embodiment of the present disclosure.

FIG. 3 illustrates a top perspective view of the truck body 102, according to an embodiment of the present disclosure. Referring to FIGS. 2 and 3, the truck body 102 includes a pair of lateral beams 130 spaced from each other. The pair of lateral beams 130 includes a first side beam 130A and a second side beam 130B disposed adjacent to the first and second side walls 116A, 116B, respectively. The first and second side beams 130A, 130B further extend between the front end 112 and the rear end 114 of the truck body 102. The truck body 102 further includes a front beam 132 disposed adjacent to the front wall 118 and extending between the first and second side beams 130A, 130B.

In one embodiment, each of the first and second tubes 126, 128 has a circular cross section defining an outer diameter 'D1' and an inner diameter 'D2'. Further, each of the first and second tubes 126, 128 has a wall thickness 'T' defined between the outer diameter 'D1' and the inner diameter 'D2'. The wall thickness 'T' may vary based on various parameters including, but not limited to, the maximum payload of the material that may be contained in the truck body 102 and a material of the first and second tubes 126, 128. In an example, the first and second tubes 126, 128 may be made from a metal or metallic alloy, such as steel. Each of the first and second tubes 126, 128 further includes a hollow space 119 defined by the inner diameter 'D2' thereof. In an embodiment, the hollow space 119 extending throughout a length of each of the first and second tubes 126, 128 is filled with polymeric material. Thus, a bending strength of each of the first and second tubes 126, 128 may be further increased. It may also be contemplated that any other polymeric material may be filled in the hollow space 119 of each of the first and second tubes 126, 128.

In the illustrated embodiment, each of the bottom beams 120 defines a plurality of notches 125 on a top surface 127 thereof. Each of the plurality of notches 125 is configured to at least partially engage with an outer surface 129 defined by the outer diameter 'D1' of each of the first tubes 126. Each of the notches 125 has a circular shape having a diameter greater than or equal to the outer diameter 'D1' of the first tube 126 such that each of the first tubes 126 may be disposed within each of the notches 125. Further, each of the notches 125 is disposed adjacent to each other such that each of the first tubes 126 may contact each other and define the bottom wall 110. Each of the first tubes 126 is further welded with the bottom beams 120 to define the bottom wall 110. A weld seam 131 may be defined between each of the first tubes 126 and the bottom beams 120.

In an embodiment, each of the first and second side beams 130A, 130B defines a plurality of notches 133 configured to at least partially engage with the outer surface 129 of each of the first tubes 126. Each of the notches 133 is disposed adjacent to each other such that each of the first tubes 126 may contact each other. Further, each of the first tubes 126 may be welded to the first and second side beams 130A, 130B to define the first and second side walls 116A, 116B. In another embodiment, each of the first tubes 126 may be welded to the first and second side beams 130A, 130B without defining the notches 133 in the first and second side beams 130A, 130B.

Similarly, the front beam 132 includes a plurality of notches 132A configured to at least partially engage with the outer surface 129 of each of the second tubes 128. Each of the notches 132A is disposed adjacent to each other such that each of the second tubes 128 may contact each other. Further, each of the second tubes 128 may be welded to the front beam 132 to define the front wall 118.

In an embodiment, the truck body 102 includes a pair of cover members 135 to close openings defined between the front wall 118 and each of the pair of lateral walls 116 from inside of the truck body 102. One cover member 135 is configured to close the opening defined between the front wall 118 and the first side wall 116A, while another cover member 135 is configured to close the opening defined between the front wall 118 and the second side wall 116B. It may also be contemplated that the cover members 135 may be mounted from outside the truck body 102 to close the openings.

In another embodiment, the truck body 102 may include one or more first intermediate beams 134 extending between the bottom beams 120 and the lateral beams 130. In such a case, the one or more first intermediate beams 134 may support the lateral beams 130 with respect to the bottom beams 120. The truck body 102 further includes a pair of bolster plates 136 disposed adjacent to the front wall 118 for supporting the front end 112 of the truck body 102 on the frame 104 of the machine 100. The pair of bolster plates 136 is supported vertically from the front beam 132. Further, a second intermediate beam 138 is disposed adjacent to the front wall 118 parallel to the front beam 132. The second intermediate beam 138 is further supported on the bottom beams 120.

Figure 5:
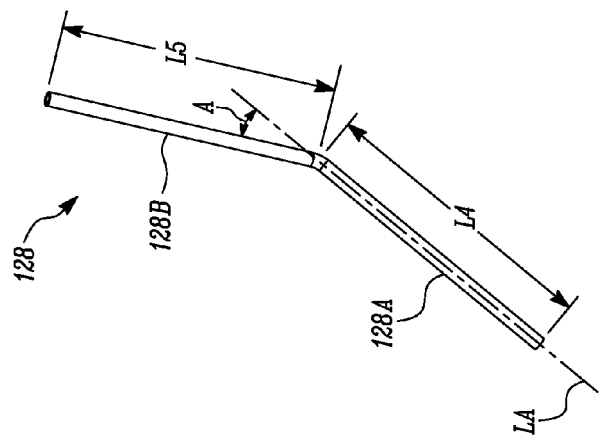
FIGS. 4 and 5 show perspective views of one of the first and second tubes, according to an embodiment of the present disclosure.
Figure 4:
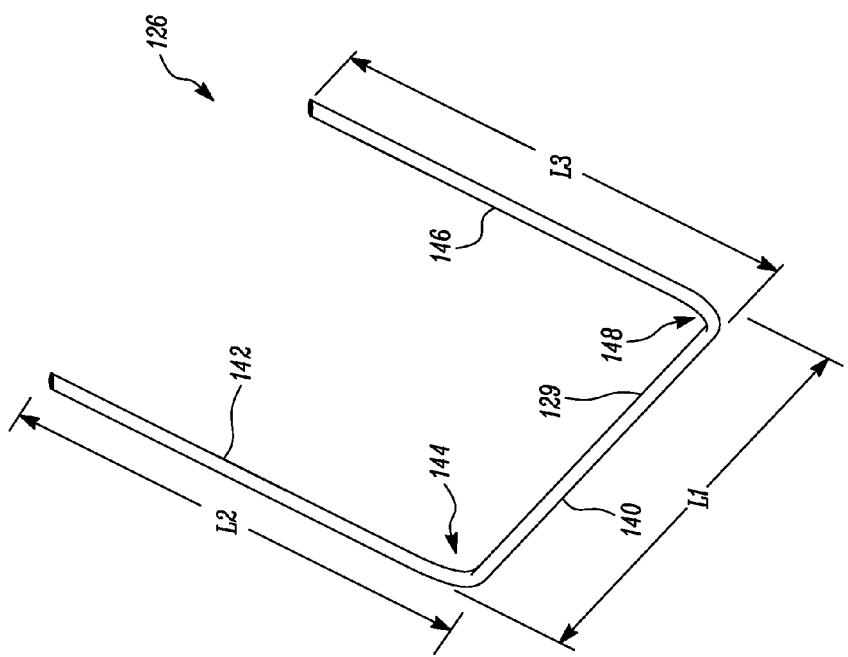

FIGS. 4 and 5 show perspective views of one of the first and second tubes 126, 128, respectively, according to an embodiment of the present disclosure. Referring to FIGS. 2 to 4, each of the first tubes 126 includes a bottom leg 140 configured to be disposed on the bottom beams 120. The outer surface 129 of the bottom leg 140 of each of the first tubes 126 is partially engaged with each of the notches 125 defined in the bottom beams 120. Thus, the bottom legs 140 of each of the first tubes 126 together define the bottom wall 110 of the truck body 102. In the illustrated embodiment, the bottom leg 140 may have a length 'L1' to define the maximum width 'W' of the truck body 102.

Further, each of the first tubes 126 includes a first side leg 142 extending from a first end 144 of the bottom leg 140. The first side leg 142 is configured to engage with the first side beam 130A. The outer surface 129 of the first side leg 142 of each of the first tubes 126 is partially engaged with each of the notches 133 defined in the first side beam 130A. Thus, the first side legs 142 of the first tubes 126 together define the first side wall 116A of the truck body 102. Similarly, each of the first tubes 126 includes a second side leg 146 extending from a second end 148 of the bottom leg 140. The second side leg 146 is configured to engage with the second side beam 130B. The outer surface 129 of the second side leg 146 of each of the first tubes 126 is partially engaged with each of the plurality of notches 133 defined in the second side beam 130B. Thus, the second side legs 146 of the first tubes 126 together define the second side wall 116B of the truck body 102.

In the illustrated embodiment, the first and second side legs 142, 146 extend vertically from the first and second ends 144, 148, respectively, of the bottom leg 140. Referring to FIG. 4, the first tube 126 disposed adjacent to the front end 112 of the truck body 102 is shown for illustrative purpose. The first and second side legs 142, 146 may have a length 'L2' and a length 'L3', respectively. The length 'L2' and 'L3' of the first and second side legs 142, 146, respectively, may correspond to the maximum height 'H' of the truck body 102. As shown in FIGS. 2 and 3, the length 'L2' of the first side leg 142 and the length 'L3' of the second side leg 146 of each of the first tubes 126 progressively reduce as a height of the first and second side walls 116A, 116B with respect to the bottom wall 110 progressively reduces from the front end 112 to the rear end 114 of the truck body 102.

In an exemplary embodiment, the first and second side legs 142, 146 of each of the first tubes 126 may be formed by bending an elongate tube having the outer diameter 'D1' and the wall thickness 'T' based on the length 'L1' of the bottom leg 140, and the lengths 'L2' and 'L3' of the first and second side legs 142, 146, respectively. In another embodiment, elongate tubes having the length 'L1', the length 'L2' and the length 'L3' may be connected with each other to define the first tube 126. In other embodiments, any number of elongate tubes may be combined to define the first tube 126. In one example, the elongate tubes may be welded each other. In another example, the elongate tubes may be connected via mechanical fasteners.

Referring to FIGS. 2, 3 and 5, each of the second tubes 128 includes a first portion 128A defining a longitudinal axis 'LA' and a second portion 128B extending from the first portion 128A at an angle 'A' with respect to the longitudinal axis 'LA' of the first portion 128A. The first portion 128A may have a length 'L4' and the second portion 128B may have a length 'L5'. In an example, the length 'L4' and the length 'L5' may be equal. In another example, the length 'L4' and the length 'L5' may vary based on the maximum height 'H' of the truck body 102. In another embodiment, the second portion 128B may extend along the longitudinal axis 'LA' of the first portion 128A, thereby defining a cylindrical tube.

The second portion 128B is configured to be engaged with the front beam 132 such that the outer surface 129 of the second portion 128B of each of the second tubes 128 is partially engaged with each of the notches 132A defined in the front beam 132. Similarly, the first portion 128A may be configured to be engaged with the second intermediate beam 138. Thus, the first and second portions 128A, 128B of each of the second tubes 128 are configured to define the front wall 118 of the truck body 102. In other embodiments, each of the second tubes 128 may include additional portion (not shown) extending from one or both of the first and second portions 128A, 128B to define the front wall 118 of the truck body 102.

In an exemplary embodiment, the first and second portions 128A, 128B of the second tube 128 may be formed by bending an elongate tube having the outer diameter 'D1' and the wall thickness 'T' at the angle 'A' based on the length 'L4' of the first portion 128A and the length 'L5' of the second portion 128B. In another embodiment, elongate tubes having the length 'L4' and the length 'L5' may be connected with each other to define the second tube 128. In other embodiments, any number of elongate tubes may be combined to define the second tube 128.

Figure 6:
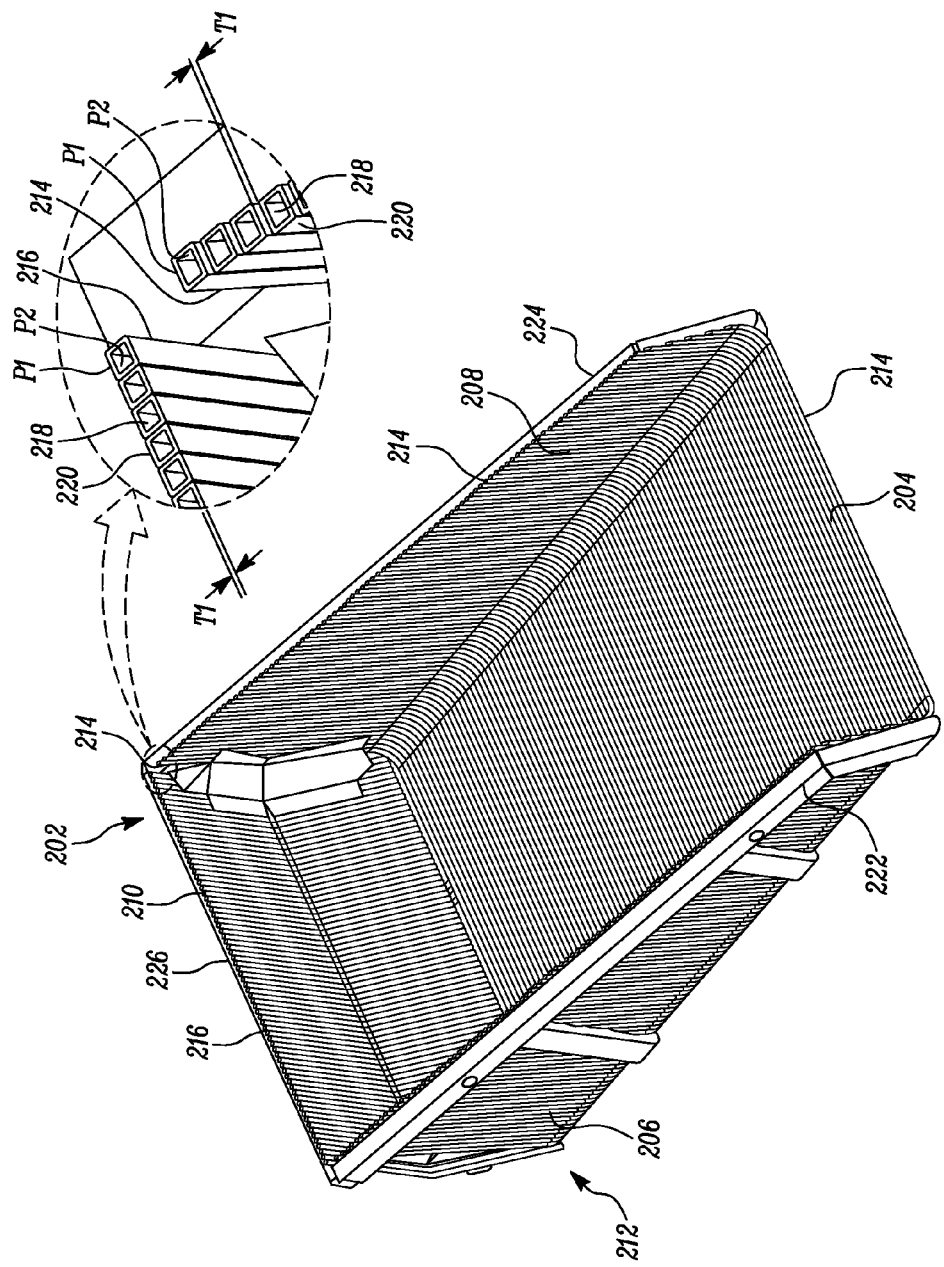
FIG. 6 is a top perspective view of a truck body formed by a plurality of first and second tubes, according to another embodiment of the present disclosure.

FIG. 6 illustrates a top perspective view of a truck body 202, according to another embodiment of the present disclosure. The truck body 202 includes a bottom wall 204, and a first side wall 206 and a second side wall 208 extending from the bottom wall 204. The truck body 102 further includes a front wall 210 extending from the bottom wall 204 at a front end 212 of the truck body 202 and further extending between the first and second side walls 206, 208. The truck body 202 further includes a plurality of first tubes 214 and a plurality of second tubes 216. Each of the first tubes 214 is disposed adjacent to each other to at least define the bottom wall 204, the first and second side walls 206, 208 of the truck body 202. Each of the second tubes 216 is configured to define the front wall 210.

Each of the first and second tubes 214, 216 has a square cross section defining an outer perimeter 'P1' and an inner perimeter 'P2'. Further, each of the first and second tubes 214, 216 has a wall thickness 'T1' defined between the outer perimeter 'P1' and the inner perimeter 'P2'. In an example, the first and second tubes 214, 216 may be made from a metal or a metallic alloy, such as steel. The first and second tubes 214, 216 further includes a hollow space 218 defined by the inner perimeter 'P2' thereof. In an embodiment, the hollow space 218 extending throughout a length of each of the first and second tubes 214, 216 is filled with a polymeric material.

In an embodiment, a plurality of notches (not shown) may be defined on the pair of bottom beams 120. Each of the notches may have a square shape corresponding to the square cross section of the first tubes 214. The notches may be configured to at least partially engage with an outer surface 220 of each of the first tubes 214. Each of the notches may be disposed adjacent to each other such that each of the first tubes 214 may contact each other and define the bottom wall 204. Further, each of the first tubes 214 may be welded with the bottom beams 120. The truck body 202 further includes a first side beam 222 and a second side beam 224 disposed adjacent to the first and second side walls 206, 208, respectively. The truck body 202 also includes a front beam 226 disposed adjacent to the front wall 210. Each of the first and second side beams 222, 224 may be configured to engage with the outer surface 220 of each of the first tubes 214. Further, each of the first tubes 214 may be welded to the first and second side beams 222, 224 to define the first and second side walls 206, 208, respectively. Further, the front beam 226 is configured to engage with each of the second tubes 216 define the front wall 210.

The cross section of the first and second tubes 214, 216, as described above, is exemplary in nature, and the first and second tubes 214, 216 may have any other cross-section, for example, a rectangular cross section, a polygonal cross-section or an elliptical cross section.

In another embodiment, a truck body may be formed from a plurality of elongate tubes and a plurality of side tubes. Each of the elongate tubes may have a first portion and a second portion extending from the first portion. The elongate tubes may be welded on the pair of bottom beams 120 with help of the one or more first intermediate beams 134, such that the first portions of the elongate tubes may together define a bottom wall of the truck body and the second portions of the elongate tubes may together define a front wall of the truck body. Further, a first side beam and a second side beam may be supported on the intermediate beams. The side tubes may be welded with the first and second side beams to define a first side wall and a second side wall of the truck body. Each of the elongate and side tubes may have a circular cross section, a square cross section, a rectangular cross section, a polygonal cross section or a cross section having any other shape known in the art. Further, each of the elongate and side tubes may define a hollow space which is filled with a polymeric material.

Figure 7:
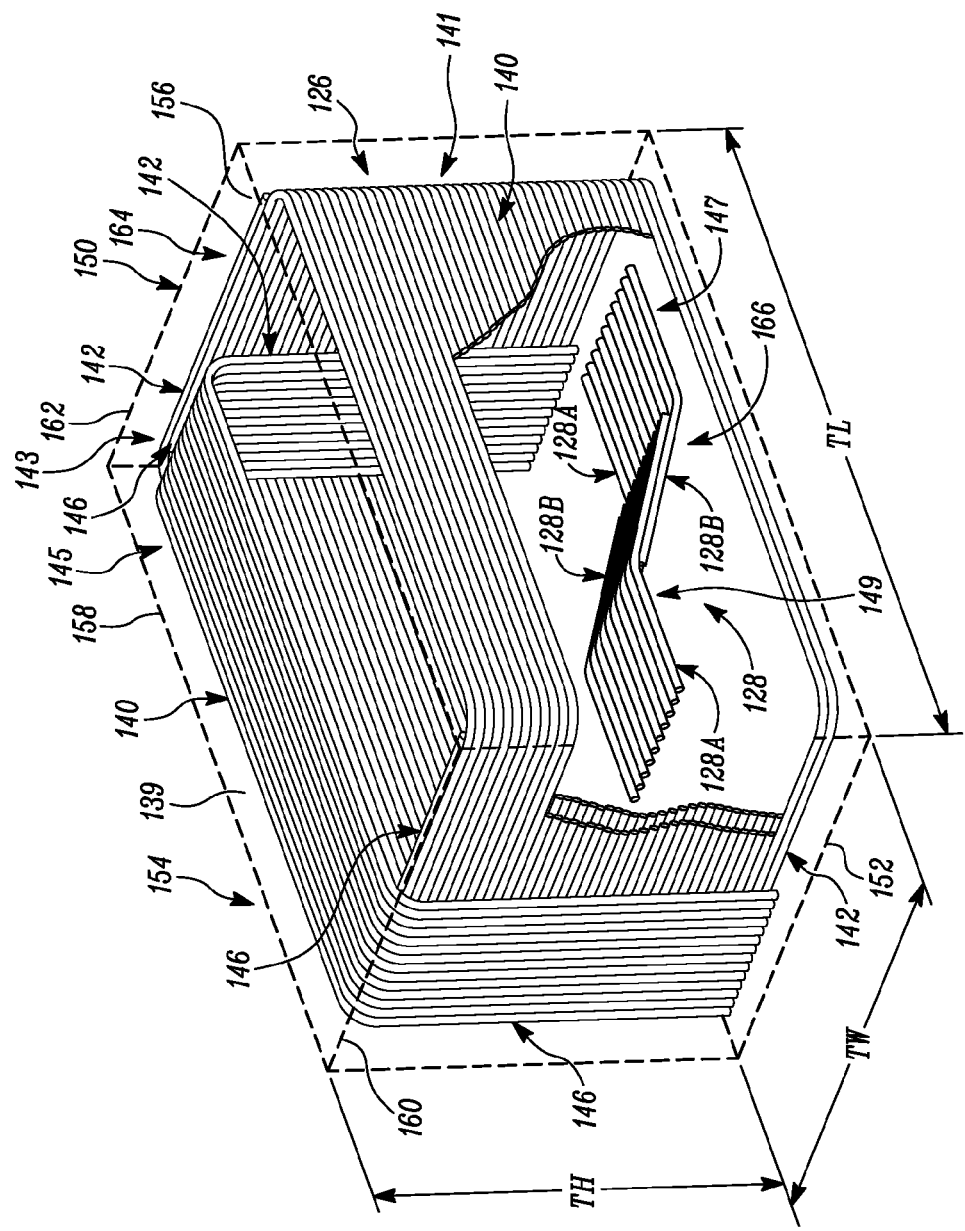
FIG. 7 is a perspective view of a transport container having the plurality first and second tubes of FIGS. 4 and 5 disposed therein, according to an embodiment of the present disclosure.

FIG. 7 is a perspective view of a transport container 150 for shipping the truck body 102, 202, according to an embodiment of the present disclosure. The transport container 150 is configured to receive the plurality of first tubes 126, 214 and the plurality of second tubes 128, 216 therein. The plurality of first and second tubes 126, 128 used for defining the truck body 102 is shown in FIG. 7 for illustrative purpose. The transport container 150 includes a base 152 and a plurality of side walls 154 extending from the base 152. The base 152 has a length 'TL' equal to or greater than the maximum width 'W' of the truck body 102 and has a width 'TW' equal to or greater than the maximum height 'H' of the truck body 102. The plurality of side walls 154 includes a first side wall 156, a second side wall 158, a third side wall 160 and a fourth side wall 162. The first side wall 156 and the second side wall 158 are laterally spaced apart each other, while the third side wall 160 and the fourth side wall 162 are longitudinally spaced apart each other. The base 152 and the first, second, third, and fourth side walls 156, 158, 160, 162 together define a space 164 therebetween. The plurality of first tubes 126 are received in the space 164 such that at least a portion of each of the plurality of first tubes 126 is disposed adjacent to one of the plurality of side walls 154 of the transport container 150. Each of the side walls 154 may have a height 'TH' with respect to the base 152 to accommodate the plurality of first and second tubes 126, 128 within the space 164.

In the illustrated embodiment, the bottom legs 140 of a first set 141 of first tubes 126 are stacked adjacent to and substantially parallel to the first side wall 156. The first and second side legs 142, 146 of the first set 141 are further stacked adjacent to the third and fourth side walls 160, 162, respectively. Similarly, the bottom legs 140 of a second set 143 of first tubes 126 is stacked adjacent to and substantially parallel to the second side wall 158. The first and second side legs 142, 146 of the second set 143 are further stacked adjacent to the fourth and third side walls 162, 160, respectively. Further, the first side legs 142 of the second set 143 are disposed adjacent to the second side legs 146 of the first set 141. The bottom legs 140 of a third set 145 of first tubes 126 are stacked adjacent to and substantially parallel to a top wall 139 of the transport container 150. The first and second side legs 142, 146 of the third set 145 are further stacked adjacent to fourth and third side walls 162, 160, respectively. It may also be contemplated that bottom legs 140 of some of the first tubes 126 may be stacked adjacent to and substantially parallel to the base 152. Further, the first and second side legs 142, 146 may be stacked adjacent to the third and fourth side walls 160, 162 respectively. Thus, the first tubes 126 for defining the bottom wall 110, and the first and second side walls 116A, 116B of the truck body 102 are accommodated within the space 164 defined by the transport container 150.

Further, the transport container 150 includes the plurality of second tubes 128 disposed within a space 166 defined by the first, second and third sets 141, 143, 145 of first tubes 126 within the transport container 150. As shown in FIG. 7, the first portions 128A of a first set 147 of the second tubes 128 are disposed adjacent to the base 152. Further, the second portions 128B of a second set 149 of the second tubes 128 are disposed over the second portions 128B of the first set 147. The first portions 128A of the second set 149 may be supported with respect to the base 152 via a supporting member (not shown). Thus, each of the plurality of second tubes 128 required for defining the front wall 118 of the truck body 102 may be disposed adjacent to each other within the space 166 defined by the plurality of first tubes 126.

The stacking of the first and second tubes 126, 128, as described above, are purely exemplary, and various alternative methods of stacking may be possible based on dimensions of the first and second tubes 126, 128, and a transport container. For example, in case a transport container has a length which is two times the length 'TL' of the transport container 150, the first and second sets 141, 143 of the first tubes 126 may be stacked adjacent to a first end of the transport container as shown in FIG. 7. Similarly, the third set 145 and the remaining first tubes 126 may be stacked adjacent to a second end of the transport container like the first and second sets 141, 143 stacked in the first end. Further, the first and second sets 147, 149 of the second tubes 128 may be stacked within a space defined by the first and second sets 141, 143, as shown in FIG. 7, and/or a space defined by the third set 145 and the remaining first tubes 126.

In various other embodiments, the bottom legs 140 of various sets of the first tubes 126 may be stacked adjacent to and substantially parallel to at least one of the first side wall 156 and the second side wall 158 of the transport container 150. Further, the first and second side legs 142, 146 of the various sets of the first tubes 126 may be stacked adjacent to the third and fourth side walls 160, 162. The second tubes 128 may be stacked within a space defined by the various sets of the first tubes 126.

INDUSTRIAL APPLICABILITY

The present disclosure relates to a method 300 of assembling the truck body 102, 202 having the plurality of first tubes 126, 214 and the plurality of second tubes 128, 216. The plurality of first tubes 126, 214 and the plurality of second tubes 128, 216 are packaged in the transport container 150 and transported along with the frame 104 of the machine 100. The first tubes 126, 214 and the second tubes 128, 216 are further assembled onsite to define the bottom wall 110, 204, the front wall 118, 210, the first side wall 116A, 206 and the second side wall 116B, 208 of the truck body 102, 202.

Figure 8:
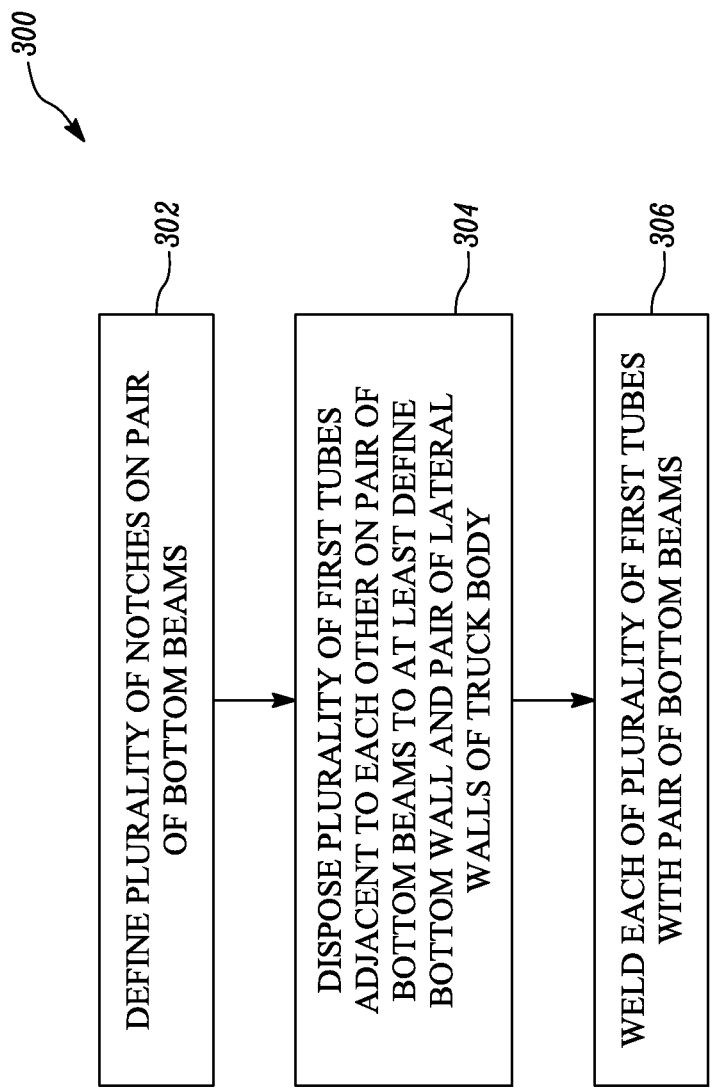
FIG. 8 is a flowchart of a method of assembling the truck body, according to an embodiment of the present disclosure.

FIG. 8 illustrates a flowchart of the method 300 of assembling the truck body 102, 202, according to an embodiment of the present disclosure. Though the method 300 will be described hereinafter with reference to the truck body 102, it may be apparent to a person of ordinary skill in the art that the method 300 may be suitably implemented to assemble the truck body 202. At step 302, the method 300 includes, defining the plurality of notches 125 on the bottom beams 120. The plurality of notches 125 may be defined on the top surface 127 of the bottom beams 120 via various machining process, such as, grinding, filing, milling or any known machining process. It may also be contemplated that the plurality of notches 125 may be defined in an elongate member and the elongate member may be further welded to the top surface 127 of the bottom beams 120. In the illustrated embodiment, the frame 104 of the machine 100 and the first and second tubes 126, 128 are transported separately from a manufacturing site to a customer site. The first and second tubes 126, 128 may be arranged within the transport container 150 as described in FIG. 7. As the first and second tubes 126, 128 are hollow and filled with a lightweight polymeric material, a weight of the truck body 102 is reduced. This may decrease a weight of the machine 100 and improve efficiency. Further, transporting the bottom and lateral beams 120, 130 separately from the first and second tubes 126, 128 may make the shipping of the truck body 102 cost effective and convenient due to lesser weight of the first and second tubes 126, 128.

At step 304, the method 300 includes disposing the first tubes 126 adjacent to each other on the bottom beams 120 to at least define the bottom wall 110 and the lateral walls 116 of the truck body 102. In an embodiment, each of the first tubes 126 may be disposed on a corresponding notch 125 of the bottom beams 120. At step 306, each of the first tubes 126 is welded to the bottom beams 120 at the corresponding notch 125. Thus, the bottom wall 110, and the first and second side walls 116A, 116B of the truck body 102 may be formed by welding each of the first tubes 126 with the bottom beams 120.

In an embodiment, the first and second side beams 130A, 130B may be disposed on the first and second side walls 116A, 116B, respectively. The first and second side legs 142, 146 of each of the first tubes 126 may be welded to the first and second side beams 130A, 130B, respectively, at the corresponding notches 133.

In another embodiment, the first and second side beams 130A, 130B may be initially supported with respect to the bottom beams 120. Further, each of the first tubes 126, having the length 'L2' of the first side leg 142 and the length 'L3' of the second side leg 146, is disposed on the bottom beams 120 between the first and second side beams 130A, 130B. After welding the first tubes 126 with the bottom beams 120, and the first and second side beams 130A, 130B, free ends of the first and second side legs 142, 146 of each of the first tubes 126 may be trimmed to define the variable height of the first and second side walls 116A, 116B, respectively, with respect to the bottom wall 110, from the front end 112 to the rear end 114 of the truck body 102.

In yet another embodiment, the lengths 'L2', 'L3' of the first and second side legs 142, 146, may be trimmed in the manufacturing site to define the variable height of the first and second side walls 116A, 116B, respectively. Further, each of the first tubes 126 may be provided with an indication mark, such as numerals or colors. Corresponding indication mark may be provided in each of the plurality of notches 125 defined in the bottom beams 120. After transportation to the customer site, each of the first tubes 126 may be disposed on each of the notches 125 based on the indication mark to define the desired height of the first and second side walls 116A, 116B. Further the first tubes 126 may be welded to the bottom beams 120 to define the first and second side wall 116A, 116B of the truck body 102.

Further, the second tubes 128 is disposed between the first and second side walls 116A, 116B at the front end 112 of the truck body 102 to define the front wall 118. The first portion 128A of each of the second tubes 128 is engaged with the corresponding notch 132A defined in the front beam 132 supported between the first and second side beams 130A, 130B. Each of the second tubes 128 may be further welded to the front beam 132 at each of the plurality of notches 132A. Further, the second portion 128B of each of the second tubes 128 may be engaged with the notches defined in the second intermediate beam 138.

According to the present disclosure, an overall weight of the truck body 102 is reduced by reducing a number of lateral beams and replacing metal plates with the first and second tubes 126, 128. Further, the bottom beams 120, the lateral beams 130, and the first and second tubes 126, 128 may be separately packaged during shipping of the machine 100. Such separate shipping may reduce a cost of shipping due to less weight. Further, such shipping may enable the bottom and lateral beams 120, 130 to be manufactured separately and at a location different from the manufacturing site of the first and second tubes 126, 128. Hence, a manufacturing flexibility of the various components of the truck body 102 may be enhanced. Further, loading and unloading of the bottom and lateral beams 120, 130 and the first and second tubes 126, 128 may be easy and time efficient. If any one or more of the first and second tubes 126, 128 are damaged, then the damaged first and/or second tubes 126, 128 may be removed from the truck body 102 and replaced with a new first and/or second tubes 126, 128 without replacing the entire truck body 102. Further, the truck body 102 may be easily assembled and disassembled at the customer site. Also, the wall thickness 'T' of each of the first and second tubes 126, 128 may be designed to contain a maximum payload of the material. Moreover, a strength of each of the first and second tubes 126, 128 may be increased by filling the polymeric material within the hollow space 119 of each of the first and second tubes 126, 128.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A truck body for a machine, the truck body comprising:
   a bottom wall defining a front end and a rear end, a pair of lateral walls extending from the bottom wall, and a front wall extending between the pair of lateral walls at the front end;
   a pair of bottom beams configured to be pivotally coupled to a frame of the machine;
   a plurality of tubes comprising a plurality of first tubes and a plurality of second tubes, the plurality of first tubes disposed on the pair of bottom beams, wherein each of the plurality of first tubes is disposed adjacent to each other to at least define the bottom wall and the pair of lateral walls of the truck body;
   a pair of lateral beams spaced from each other, wherein each of the pair of lateral beams is disposed on a corresponding lateral wall of the pair of lateral walls defined by the plurality of first tubes
   a front beam extending between the pair of lateral beams at the front end of the bottom wall;
   each of the plurality of first tubes further comprising:
      a bottom leg disposed on the pair of bottom beams, wherein the bottom legs of the plurality of first tubes together define the bottom wall of the truck body;
      a first side leg extending from a first end of the bottom leg, the first side leg configured to engage with one of the pair of lateral beams, wherein the first side legs of the plurality of first tubes together define one of the pair of lateral walls of the truck body; and
      a second side leg extending from a second end of the bottom leg, the second side leg configured to engage with the other of the pair of lateral beams, wherein the second side legs of the plurality of first tubes together define the other of the pair of lateral walls of the truck body; and
   the plurality of second tubes extending from the front end of the bottom wall, wherein each of the plurality of second tubes is disposed adjacent to each other to define the front wall of the truck body.

2. The truck body of claim 1, wherein the plurality of second tubes are disposed between the pair of lateral beams.

3. The truck body of claim 2, wherein each of the plurality of second tubes is configured to engage with the front beam.

4. The truck body of claim 1, wherein each of bottom beams defines a plurality of notches on a top surface thereof, and wherein each of the notches is configured to at least partially engage with an outer surface of the bottom leg of each of the plurality of first tubes.

5. The truck body of claim 1, wherein one of the pair of lateral beams defines a plurality of notches, and wherein each of the plurality of notches is configured to at least partially engage with an outer surface of the first side leg of each of the plurality of first tubes.

6. The truck body of claim 1, wherein the other of the pair of lateral beams defines a plurality of notches, and wherein each of the plurality of notches is configured to at least partially engage with an outer surface of the second side leg of each of the plurality of first tubes.

7. The truck body of claim 1, wherein the front beam defines a plurality of notches configured to at least partially engage with an outer surface of each of the plurality of second tubes.

8. The truck body of claim 1, wherein each of the plurality of tubes is filled with a polymeric material.

9. The truck body of claim 1, wherein each of the plurality of tubes is welded to the pair of bottom beams.

10. The truck body of claim 1, wherein each of the plurality of tubes has a circular cross section.

11. The truck body of claim 1, wherein each of the plurality of tubes has a square cross section.

12. A transport container for shipping a truck body, the truck body comprises a plurality of first tubes configured to define a bottom wall and a pair of lateral walls for the truck body, the transport container comprising:
   a base; and
   a plurality of side walls extending from the base, wherein the base and the plurality of side walls define a space therebetween, wherein the space is configured to receive the plurality of first tubes such that at least a portion of each of the plurality of first tubes is disposed adjacent to one of the plurality of side walls of the transport container;
   wherein the base of the transport container has a length equal to or greater than a maximum width of the truck body;
   wherein the base of the transport container has a width equal to or greater than a maximum height of the truck body; and
   a plurality of second tubes disposed within a space defined by the plurality of first tubes within the transport container, wherein each of the plurality of second tubes is configured to define a front wall of the truck body.

13. A method of assembling a truck body of a machine, the method comprising:
   defining a plurality of notches on a pair of bottom beams, the pair of bottom beams configured to be pivotally coupled to a frame of the machine;
   disposing a plurality of first tubes adjacent to each other on the pair of bottom beams to at least define a bottom wall and a pair of lateral walls of the truck body, wherein each of the plurality of first tubes is engaged with each of the plurality of notches;
   welding each of the plurality of first tubes with the pair of bottom beams; and
   disposing a pair of lateral beams on a corresponding lateral wall of the pair of lateral walls defined by the plurality of first tubes, wherein the lateral beams define a plurality of notches configured to engage with the plurality of first tubes.

14. The method of claim 13 further comprising disposing a plurality of second tubes between the pair of lateral beams to define a front wall of the truck body.

* * * * *